United States Patent [19]

Frey

[11] 4,337,955
[45] Jul. 6, 1982

[54] SEAL FOR A CYLINDER-PISTON ARRANGEMENT

[75] Inventor: Bernhard Frey, Schaffhausen, Switzerland

[73] Assignee: Hydrowatt Systems Limited, London, England

[21] Appl. No.: 136,922

[22] Filed: Apr. 3, 1980

[30] Foreign Application Priority Data

Apr. 6, 1979 [CH] Switzerland ..................... 3260/79

[51] Int. Cl.³ ..................... B21D 22/12; F16J 15/2
[52] U.S. Cl. .................................. 277/12; 42/102
[58] Field of Search ................ 277/12, 189, 188 A; 92/102, 86.5, 92.48

[56] References Cited

U.S. PATENT DOCUMENTS

| | | | |
|---|---|---|---|
| 1,964,745 | 7/1934 | Sauzedde | 92/102 |
| 3,949,583 | 4/1976 | Syuakari | 92/102 |
| 4,109,535 | 8/1978 | Reed | 92/102 |
| 4,215,869 | 8/1980 | Pennzeton | 277/12 |

Primary Examiner—Robert I. Smith

Attorney, Agent, or Firm—Yount & Tarolli

[57] ABSTRACT

The tubular sealing element consisting of flexible material, between a cylinder and a piston as working members for the formation of a pressure working space is connected by a connection of the substance of the material, in particular by a vulcanized connection (10) to one working member (1) which forms a bearing surface (4) for the sealing element under the action of the working pressure. This connection makes possible secure closure and gentle introduction of the stresses into the flexible material of the seal. Preferably the connection area (11) of the working member (1) is made toroidal with a uniformly curved profile, whereby stress concentrations in the connection region are reduced. In addition a compressive prestress of the material of the seal may be provided in the connection region between corresponding solid bodies (1a, 11a) with the advantage of the additional safety and the closure of the connection of the substance of the material, against attack by a lubricant introduced if necessary between the bearing surface (4) and the sealing tube (3).

9 Claims, 1 Drawing Figure

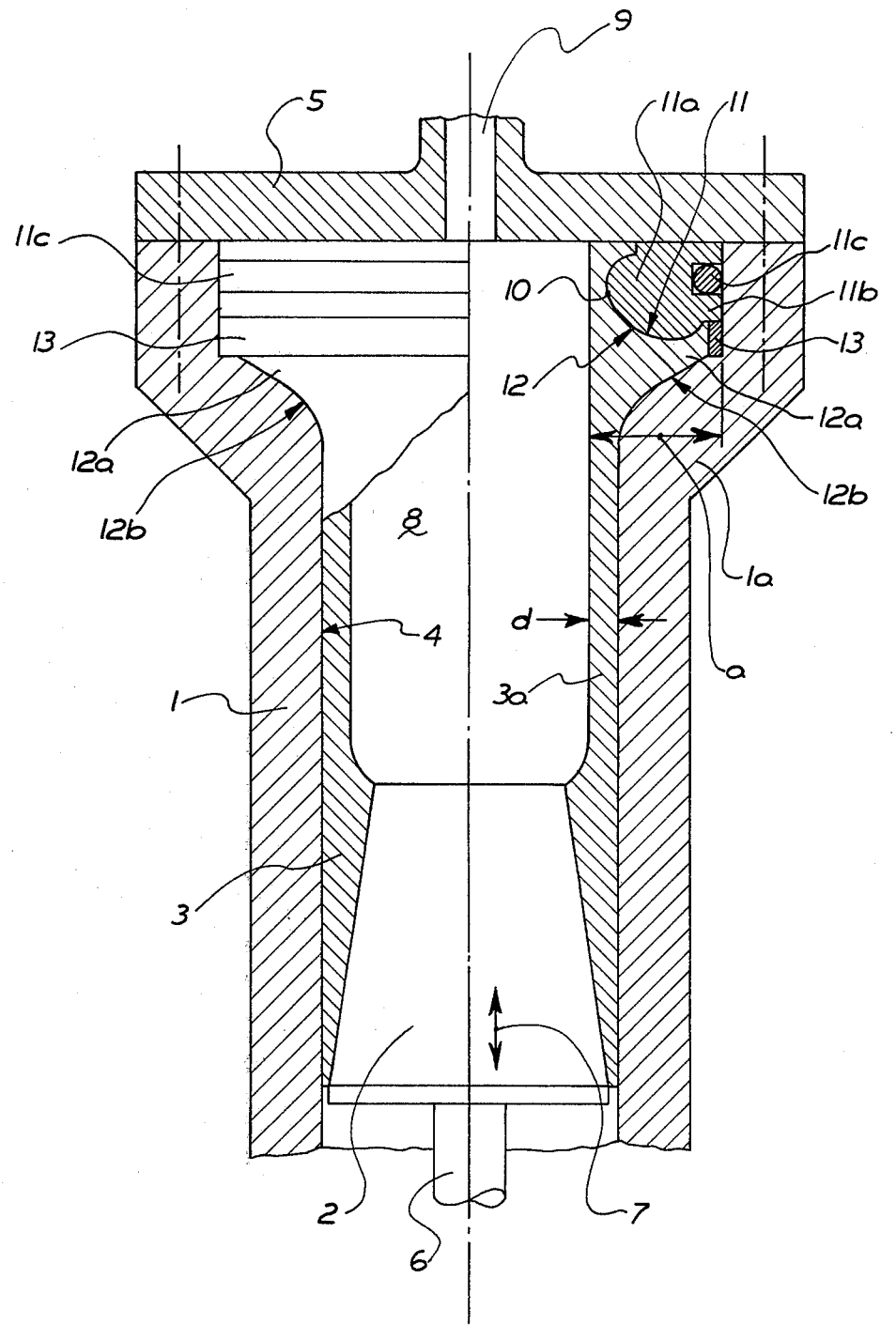

SEAL FOR A CYLINDER-PISTON ARRANGEMENT

The invention refers to a seal for a cylinder-piston arrangement having at least two working members which oscillate relatively to one another for the formation of a pulsating working space and having a tubular sealing element which consist at least partially of flexible material and which bears directly or via a lubricant against a bearing surface of one working member and is connected on one side to the first working member which forms this bearing surface as well as on the other side to a second working member which is moved relatively to the bearing surface.

A seal of the aforesaid kind is known from the West German O/S No. 25 54 733. Here the tubular flexible sealing element is fastened by means of a clamp connection onto the working member forming the bearing surface. Such a connection has the advantage of simple mounting and interchangeability of the sealing element. But what is disadvantageous is the non-uniform distribution of stress inside the flexible material in the connection region with transition from heavy compressive stress to like tensile stress in the actual tube region. These clamping conditions make an approximately all round pressure of the flexible material against the sealing faces possible only by putting up with a comparatively complicated cross-sectional shape of the clamping device. Yet pressing out, the socalled "extruding out", of the flexible material from the pressure region of the clamping device in the direction towards the region of tensile stress can in practice be excluded only with difficulty. Reliable connection and sealing between the tube and the working member against escape of the working medium at high pressure can therefore be ensured only with comparatively high structural outlay and by strict requirements as to the fatigue strength of the flexible material, in particular as regards the pulsating tensile stresses which arise during the working movement and the corresponding alternating deformations in the connection region.

The object of the invention therefore is the creation of a seal for a cylinder-piston arrangement which is distinguished by great safety in service with simple construction and comparatively low loading of the flexible material of the sealing element. The solution of this problem, in accordance with the invention, is achieved by providing a rigid body between the sealing element and one of the working member, and by bonding a part of the surface of the sealing element which bears against a support surface formed by the one of the working member to the rigid body so that the surface portion of the tubular member bonded to the rigid body and the rigid body are immovable relative to the support surface as the sealing element stretches and contracts. The connection of the substance of the material which is therein provided for and which in the case of a suitable quality of the flexible material of the sealing element may be produced, say, by gluing, enables compressive stresses to be largely avoided in the connection region and thereby also the transition between heavy compressive stresses and tensile stresses with correspondingly heavy non-uniform distribution of stress such as occurs in the case of a clamp connection. Instead the tensile stresses arising in the tube body of the sealing element are transferred in the form of shear and tensile stresses directly onto the connection area of the working member forming the bearing wall or a suitable solid intermediate part. For such direct transfer of shear and tensile stress what is of preferred suitability is a connection of the substance of the material, formed by vulcanization, for the case of a tubular sealing element consisting of rubber or rubbery material.

The production of a reliable connection of the substance of the material, in particular of a connection by vulcanization, makes necessary a careful pretreatment, in particular cleaning and if necessary roughening of the solid connection area on the side of the working member. In order not to load these working steps with the handling of the whole working member, it is to be recommended in accordance with a further development of the invention that the first connection area for the connection of the substance of the material be made on a ringlike or flangelike intermediate part which in turn is connected positively to the working member forming the bearing wall. The choice of the material for the working member and the bearing surface is also thereby facilitated as regards sliding and wear characteristics on the one hand as well as for the intermediate part as regards its connection characteristics to the flexible material on the other hand.

A flow of force as steady as possible and free of steep stress gradients in the transition and connection region of the sealing tube can further be achieved by a special construction of the annular intermediate part. For that purpose in accordance with a further development of the invention an annular intermediate part is provided, the surface of which, orientated radially inwards, is made as a connection area which in the axial section of the ring is curved convexly for the connection of the substance of the material. A steady transition thereby results between the central regions of the connection area with its comparatively high shear and tensile stresses and the edge regions of the connection face in which the stresses drop to zero. In this way again injurious notch effects in the connection region of the flexible material can largely be avoided. Furthermore the connection area may be increased and thereby the maximum tensile or shear stress respectively reduced, by the connection area being drawn comparatively far round the convexly curved annular profile in the axial and if necessary also the radial direction towards the outside.

Further features and advantages of the invention are explained with the aid of the embodiment illustrated in the drawing, which reproduces a diagrammatic axial section of a tubular sealing element with a connection region to a cylindrical working member having a bearing wall.

In the case of the example a cylinder 1 is provided as a first working member and a piston 2 arranged in it as a second working member. A tubular sealing element 3, e.g., consisting of highly elastic rubber capable of being vulcanized produces a resilient sealing connection between the two working members and bears by the outside of it via a layer of lubricant (not shown) against an inner bearing surface 4 on the cylinder 1. At the top the cylinder 1 is closed off by a bolted cover 5, whilst the piston 2 is set in oscillating motion with respect to the cylinder 1 in the direction of the double arrow 7 by a driving member 6 not shown in greater detail. Hence there results inside the tubular sealing element 3 a pulsating working space 8 which is connected, e.g., via a connecting pipe 9 to the inlet and exhaust valves (not shown) of a hydraulic system. Pumps or motors having cylinder-piston arrangements sealed in this way are employed above all in high pressure systems and in the case of the demands of media which have to be closed off hermetically.

The connections of the tubular sealing element 3 to the two working members in the preferred applications at high pressure and in particular in the case of high working frequencies in addition, with corresponding alternating deformations, are subject to heavy loadings. This applies above all as regards the transfer to the working member of the axial tensile stresses arising in the tube body. Whilst for the increase of the connection area between the sealing element and the piston 3—as illustrated in the drawing—a relatively great axial structural length is now readily available, this does not readily apply to the connection to the cylinder 1 forming the bearing wall 4 if the dead portion of the working space is not to be undesirably increased. The relatively easy enlargement of the connection areas next the piston therefore allows low specific surface loadings, wherefore connections of the substance of the material have already been proposed at this point, but not at the point of connection between the sealing element and the bearing wall or respectively the cylinder. But in accordance with the invention this view has been refuted by practical executions and tests, in particular with the employment of suitable materials which take kindly to vulcanization, for the connection area next the cylinder as well as by the application of profilings to the connection area, which yield a favourable flow of force with low stress gradients inside the material of the seal and inside the connection areas. In the drawing such features are illustrated.

Here a connection 10 of the substance of the material is formed between a toroidal connection area 11 on the solid body on the cylinder side and a connection area 12 on the soft body on the seal side, which in the case of rubber as the material of the seal is preferably done by vulcanization. The solid body on the cylinder side of this connection is made as a ringlike intermediate part 11a which is separate from the cylinder 1 but is connected to it positively at an edge section 11b projecting radially outwards, by axial bracing between the cover 5 and a spacer ring 13. In this way optimum materials may be chosen without any opposite considerations, for the connection area 11 of the solid body on the one side and for the bearing wall 4 or respectively the cylinder 1 on the other side. Again through this structural separation the machining and profiling of the connection area 11 to be suitable for the connection is facilitated or on the whole made possible for the first time, as is illustrated by the annular shape which in cross-section is curved convexly radially inwards as well as axially on both sides and must be produced by undercutting. This curvature of the connection area 11 which largely embraces the annular profile leads to a gradual transition between the points of maximum tensile and shear stress and the edge regions of the connection area where the stresses drop to zero.

A stable equilibrium between the tensile stress region in the cylindrical part 3a of the sealing element 3 and the transition section 12a more or less dominated by shear stresses is favoured by the illustrated profiling with an intermediate section 12b made as a concave taper. The transition section 12a exhibits a radial dimension a which amounts to a multiple of the thickness d of the wall of the tube. This enables an ample dimensioning of the connection areas without increase in the axial structural length and thereby the dead portion of the working space. The correspondingly small radii of curvature of the connection areas avoid the notch effect which is particularly dangerous for the alternating loading and in general reduce the stress gradients in the field of stress inside the flexible material of the seal.

For the rest, in particular in the interest jof a partial relief of tension in the connection 10 of the substance of the material, in the region of its axial parts of the connection areas a pressure bracing of the transition section 12a standing out radially between the annular intermediate part 11a and the shoulder 1a on the cylinder 1 may be adjusted by appropriate dimensioning of the spacer ring 13. Under certain circumstances this has great significance for the fatigue strength of the connection.

For a reliable seal between the working space 8 and the clearance volume filled if necessary with lubricant, between the sealing element 3 and the bearing surface 4, independently of the axial bracing of the annular intermediate part 11a and the spacer ring 13 there is in the case of the example arranged on the outside of the intermediate part 11a an intermediate seal 11c—here in the form of an O-ring—inside a circumferential groove. This intermediate seal acts against the inner face of the recess in the cylinder 1, which receives the part 11a and the transition section 12a as well as the spacer ring 13.

I claim:

1. An apparatus comprising at least two relatively movable working members, an elastic tubular member sealingly engaging said working members as spaced locations and at least partially defining a working chamber, said tubular member stretching and contracting and said working chamber varying in volume as said working members move relatively, said tubular member having a surface bearing at least partially against a support surface formed by one of said working members, a rigid body being located in the area of the sealing engagement of said tubular member with said one of said working members, said rigid body being part of or connected with said one of said working members, and said surface of said tubular member bearing against said support surface of said one of said working members having a surface portion bonded to said rigid body, said surface portion of said tubular member bonded to said rigid body and said rigid body being immovable relative to said support surface as said tubular member stretches and contracts and the volume of said working chamber varies.

2. An apparatus as set forth in claim 1 wherein said elastic tubular member is fabricated from rubber or rubber material and is bonded to said rigid body by vulcanization.

3. An apparatus as set forth in claim 1 or 2 wherein said rigid body comprises an intermediate member located between said support surface and said tubular member, said intermediate member being annular and having a toroidal convexly curved surface, and said tubular member having a corresponding concavely curved surface bonded to said convexly curved surface of said intermediate member.

4. An apparatus as set forth in claim 3 wherein said toroidal convexly curved surface of said intermediate member curves in an axial direction.

5. An apparatus as set forth in claim 4 wherein said intermediate member includes an edge portion projecting radially from above the connection region of said tubular member with said intermediate member, said edge portion having a recess, and a sealing ring located in said recess and sealing against said support surface of said one of said working members.

6. An apparatus as set forth in claims 1 or 2 wherein said portion of said tubular member bonded to said rigid body forms part of a transition section of said tubular member, said transition section having a wall thickness greater than the wall thickness of said tubular member at other locations.

7. An apparatus as set forth in claim 6 wherein said transition section has a tapered surface portion bearing against a corresponding tapered surface portion of said support surface of said one working member.

8. An apparatus as set forth in claim 7 including means for forcing said tapered surface portion of said transition section into sealing engagement with said corresponding tapered surface portion of said support surface of said one working member.

9. An apparatus as set forth in claim 7 or 8 wherein said transition section is located between said rigid body and said support surface of said one working member.

* * * * *

UNITED STATES PATENT AND TRADEMARK OFFICE
CERTIFICATE OF CORRECTION

PATENT NO. : 4,337,955
DATED : July 6, 1982
INVENTOR(S) : Bernhard Frey

It is certified that error appears in the above-identified patent and that said Letters Patent are hereby corrected as shown below:

Column 4, line 29, change "as" to --at--.

Signed and Sealed this

Twenty-first Day of September 1982

[SEAL]

Attest:

GERALD J. MOSSINGHOFF

Attesting Officer

Commissioner of Patents and Trademarks